United States Patent [19]

Westphal

[11] Patent Number: 5,564,379
[45] Date of Patent: Oct. 15, 1996

[54] ARRANGEMENT FOR BALANCING VARYING MOMENTS

[75] Inventor: Christian Westphal, Meine, Germany

[73] Assignee: Volkswagen AG, Wolfsburg, Germany

[21] Appl. No.: 447,440

[22] Filed: May 23, 1995

[30] Foreign Application Priority Data

Jun. 1, 1994 [DE] Germany ............... 44 19 196.0

[51] Int. Cl.⁶ .................................................. F02B 75/06
[52] U.S. Cl. ........................... 123/192.1; 123/192.2
[58] Field of Search ............................. 123/192.2, 192.1

[56] References Cited

U.S. PATENT DOCUMENTS

| | | | |
|---|---|---|---|
| 3,563,223 | 2/1971 | Ishida | 123/192.2 |
| 5,065,644 | 11/1991 | Shimada | 74/603 |

FOREIGN PATENT DOCUMENTS

| | | |
|---|---|---|
| 2713403 | 4/1984 | Germany. |
| 3720559 | 1/1988 | Germany. |

*Primary Examiner*—Noah P. Kamen
*Attorney, Agent, or Firm*—Brumbaugh, Graves, Donohue & Raymond

[57] ABSTRACT

An arrangement for balancing varying moments in a motor vehicle includes an internal combustion engine, an attached transmission, a secondary shaft coupled to the crankshaft of the engine and extending into the transmission and rotating at a higher speed than the crankshaft, a shift clutch on the secondary shaft, and a flywheel and starter ring gear on the secondary shaft providing balancing masses. The moments of inertia of the balancing masses and of the shift clutch, on the one hand, and of the inertial masses associated with the crankshaft, on the other hand, are identical when the reduction gear ratio between the crankshaft and secondary shaft is taken into account.

9 Claims, 1 Drawing Sheet

ARRANGEMENT FOR BALANCING VARYING MOMENTS

BACKGROUND OF THE INVENTION

This invention relates to arrangements for balancing varying moments of the type produced in the drive train of a motor vehicle having an internal combustion engine. German Offenlegungsschrift No. 37 20 559 discloses an arrangement for balancing varying moments which includes an additional balancing mass arranged on a secondary shaft and takes into account the gear ratio between the crankshaft and the secondary shaft in balancing the moments of inertia, and which is also effective in a constant rotational-speed range.

In internal combustion engines which are optimized in terms of weight and of friction efficiency and/or those which have a small volume, for example those with less than four cylinders, such balancing arrangements are not useful because of the additional cost of the components and the additional weight involved.

In German Offenlegungsschrift No. 27 13 403, a balancing arrangement is disclosed which employs a shift clutch as a balancing mass to compensate for torque reactions during changes in rotational speed, i.e., during acceleration. For this purpose, the shift clutch is arranged on an intermediate shaft which rotates at the same speed as the crankshaft but in the opposite direction. In addition, the intermediate shaft carries eccentrically arranged additional masses and extends out of one end of the crankcase. The shift clutch is arranged on the intermediate shaft directly behind the input for the intermediate shaft with respect to the direction application of the driving force or moment, and the output side of the shift clutch drives a transmission.

SUMMARY OF THE INVENTION

Accordingly, it is an object of the present invention to provide an arrangement for balancing varying moments produced in the drive train of a motor vehicle which overcomes the disadvantages of the prior art.

Another object of the invention is to provide an arrangement for balancing moments generated by acceleration forces or inertia forces while maintaining the total weight and cost of the arrangement as low as possible.

These and other objects of the invention are attained by providing a secondary shaft running at a higher rotational speed than the crankshaft and having a symmetrical balancing mass between the input to the secondary shaft and a shift clutch for coupling the shaft to a transmission.

Because the secondary shaft runs at a higher rotational speed than the crankshaft and carries a rotationally symmetrical balancing mass between its input and the shift clutch, a substantial balancing of varying moments can be achieved provided that the rotational-speed ratio between the crankshaft and secondary shaft is appropriate. Advantageously, at the same time, the balancing mass can constitute a flywheel for the reciprocating internal combustion engine or it can include a starter ring gear or a combination thereof. The balancing mass is thus formed by components which are necessary in any case. In other words, no additional masses are needed and the total weight and cost of the components are low. The higher rotational speed of the secondary shaft in relation to the oppositely rotating crankshaft limits the weight required for the balancing masses, since the lower moment of inertia of the balancing mass in relation to the moment of inertia of the inertial masses associated with the crankshaft is compensated by the increased rotational speed.

In a further advantageous embodiment, a low component cost and a compact design are achieved by positioning the secondary shaft coaxially in alignment with the input shaft to a transmission unit which is mounted with flanges directly onto the crankcase of the internal combustion engine. As a result of the increased rotational speed of the transmission, its components can be designed for lower moments, thus contributing to the overall weight reduction.

The secondary shaft can be driven directly by the crankshaft in a simple manner, by forming a driving gear on a crank web of the crankshaft which engages a driven gear on the secondary shaft without any play.

Moreover, the secondary shaft can be utilized to drive other components, for example, auxiliary components of the internal combustion engine, by extending the secondary shaft out of the crankcase and providing a corresponding drive wheel.

A reduction of the higher rotational speed which is introduced into the transmission by the secondary shaft can be carried out by a reduction gear stage arranged on the output side of the transmission or on a differential connected to the drive wheels of a motor vehicle provided with the drive train or by a backgear. The moment of inertia of the balancing mass multiplied by the reverse ratio between the crankshaft and the secondary shaft corresponds to the moment of inertia of the inertia masses associated with the crankshaft.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
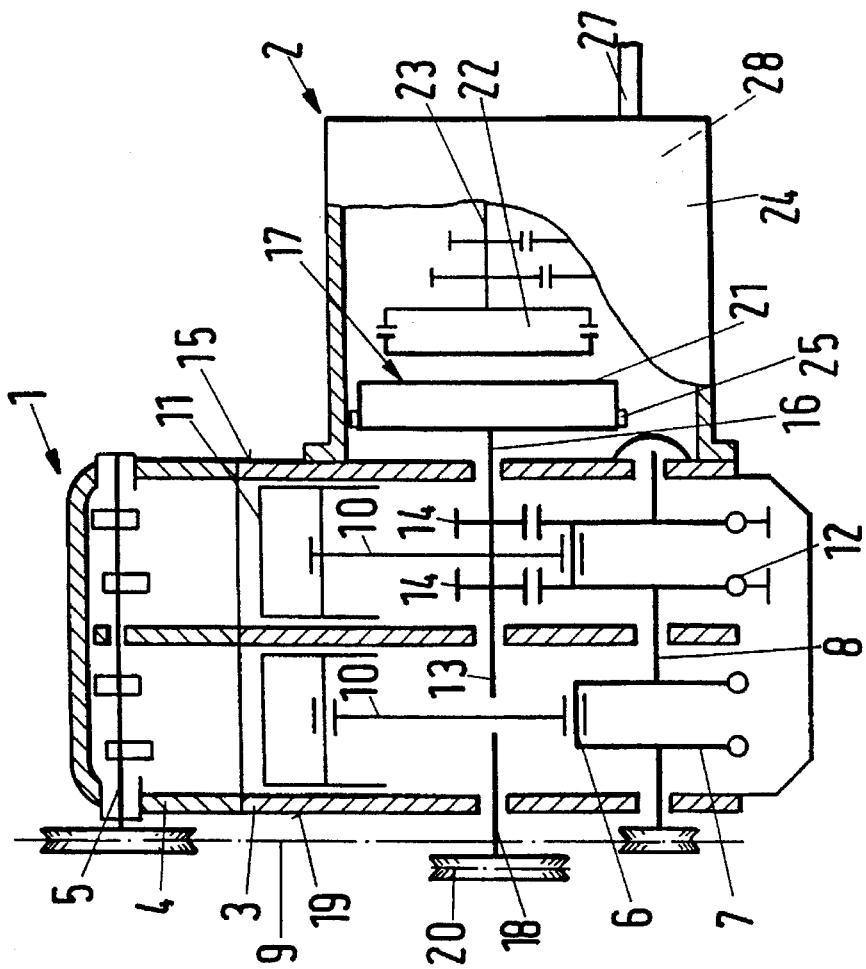
FIG. 1 is a schematic cross-sectional view showing a typical multi-cylinder reciprocating internal-combustion engine with an attached transmission according to the invention.
Figure 2:
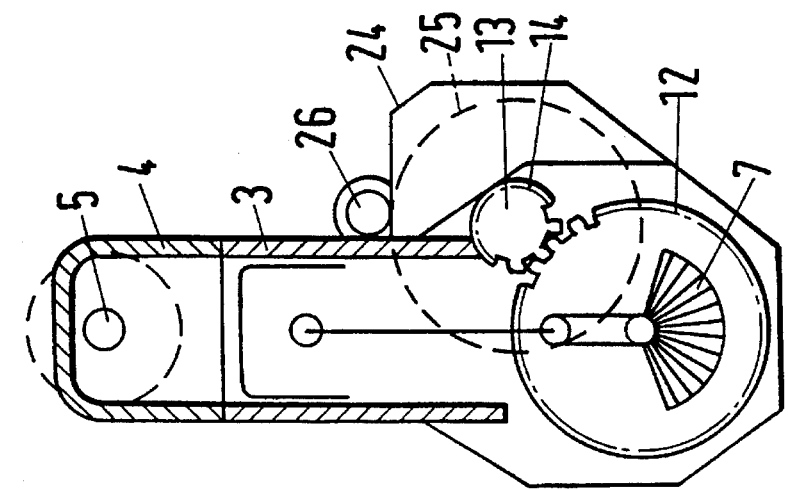
FIG. 2 is a schematic side view of the engine shown in FIG. 1.

In the representative embodiment of the invention shown in the drawings, a motor vehicle (not shown) has a drive train including an internal combustion engine 1 and a transmission 2 attached to the engine 1 by flanges. A cylinder head 4 containing a camshaft 5 is mounted on a crankcase 3 containing a crank mechanism for the internal-combustion engine 1. The crank mechanism includes a crankshaft 8 provided with crankarms 6 and crank webs 7 which drives the camshaft 5 through a timing belt 9, and also includes connecting rods 10 connected between the crankarms 6 and corresponding pistons 11.

The crank webs 7, which are adjacent to the crankarms 6 for each of the cylinders, are formed with gears 12 which engage corresponding driven gears 14 arranged on a secondary shaft 13 without any play.

The secondary shaft 13 extends the length of the internal combustion engine 1 and has a part 16 projecting beyond one end 15 of the internal combustion engine which carries a balancing mass 17. A stub 18 of the secondary shaft 13 extends out of opposite end face 19 of the engine and carries a driving wheel 20 for driving auxiliary components of the engine (not shown).

In the illustrated embodiment, the balancing mass constitutes a flywheel 21 for the reciprocating internal combustion engine 1 mounted on the part 16 of the secondary shaft 13 and the shaft 13 is coaxially in alignment with an input shaft 23 for the transmission 2. The transmission 2 has a housing 24 which is mounted directly on the end face 15 of the crankcase 3 by flanges and receives the part 16 of the secondary shaft 13 carrying the balancing mass 17 and contains a shift clutch 22. The flywheel 21 is formed with a starter ring gear 25 on its periphery which increases the balancing mass 17 and which is engaged by a starter 26 during starting of the internal combustion engine 1. On the output side, the transmission 2 has a transmission output shaft 27 which is driven from the input shaft 23 by a reduction gear stage 28 which reduces the rotational speed of the output shaft.

When the internal combustion engine is in operation, it is subjected to varying moments which are caused by the acceleration moments that are variable in time, on the one hand, and by the inertial masses associated with the crankshaft 8, such as the pistons 11 and connecting rods 10, on the other hand. The moment of inertia of the balancing mass 17 arranged on the secondary shaft 13 and of the shift clutch 22, multiplied by the reverse gear ratio between the crankshaft 8 and the secondary shaft 13, corresponds to the moment of inertia of the inertial masses associated with the crankshaft 8.

Although the invention has been described herein with reference to a specific embodiment, many modifications and variations therein will readily occur to those skilled in the art. Accordingly, all such variations and modifications are included within the intended scope of the invention.

I claim:

1. Arrangement for balancing of varying moments of a reciprocating internal combustion engine, comprising a crankcase, a crankshaft mounted in the crankcase, a secondary shaft driven by the crankshaft to rotate in the opposite direction and at a higher speed than the crankshaft, a shift clutch connected to the secondary shaft and contributing to the compensation of varying moments generated by the internal combustion engine, and a rotationally symmetrical balancing mass on the secondary shaft between an input thereto and the shift clutch.

2. Arrangement according to claim 1 wherein the balancing mass comprises a flywheel for the internal combustion engine.

3. Arrangement according to claim 2 wherein the secondary shaft has a part extending outside at least one end face of the crankcase and wherein the shift clutch is positioned on that part.

4. Arrangement according to claim 3 including a transmission having an input shaft and wherein the secondary shaft is coaxially aligned with the transmission input shaft.

5. Arrangement according to claim 1 including at least one driven gear on the secondary shaft which engages a driving gear formed on a crank web of the crankshaft.

6. Arrangement according to claim 3 wherein the secondary shaft has a stub extending outside the crankcase through an end face thereof and including a driving wheel mounted on the stub.

7. Arrangement according to claim 3 wherein the balancing mass is mounted on the part of the secondary shaft within a transmission housing.

8. Arrangement according to claim 4 wherein the transmission has a reduction stage at its output side for reducing the higher rotational speed of the secondary shaft.

9. Arrangement according to claim 1 wherein the moment of inertia of the balancing mass on the secondary shaft and of the shift clutch, multiplied by the rotational speed ratio of the secondary shaft with respect to the crankshaft balances the moment of inertia associated with the crankshaft.

* * * * *